United States Patent [19]

Cavitt

[11] Patent Number: 4,713,404

[45] Date of Patent: Dec. 15, 1987

[54] PAINT FORMULATION COMPRISING A THERMALLY STABLE CAPPED THERMOPLASTIC PHENOLIC RESIN

[75] Inventor: Michael B. Cavitt, Lake Jackson, Tex.

[73] Assignee: The Dow Chemical Company, Midland, Mich.

[21] Appl. No.: 907,566

[22] Filed: Sep. 15, 1986

Related U.S. Application Data

[62] Division of Ser. No. 755,260, Jul. 15, 1985, Pat. No. 4,632,971.

[51] Int. Cl.$^4$ ................................................ C08K 5/41
[52] U.S. Cl. ...................................... 523/172; 524/611
[58] Field of Search ......................... 523/172; 524/611

[56] References Cited

U.S. PATENT DOCUMENTS

| | | | |
|---|---|---|---|
| 3,356,624 | 12/1967 | Neal et al. | 523/172 |
| 3,446,762 | 5/1969 | Lopez et al. | 523/172 |
| 3,787,349 | 1/1974 | Eliasson | 523/172 |
| 4,203,878 | 5/1980 | Bauer | 523/172 |

OTHER PUBLICATIONS

Lee et al, Handbook of Epoxy Resins, McGraw-Hill (1967) pp. 7-20, 10-4, 10-5, 13-6, 16-9, 21-35 and 24-14.

Dale, J. M., Development of Lane Delineation with Improved Durability, Fed. Hwy. Admins., Report No. FHWA-RD-75-70, Jul. 1975.

*Primary Examiner*—Lucille M. Phynes

[57] ABSTRACT

A paint formulation for highway pavement marking is disclosed which comprises (I) a heat stable thermoplastic phenolic resin is prepared by (A) reacting (1) the reaction product of (a) at least one epoxy resin having an average of more than one vicinal epoxy group per molecule such as a diglycidyl ether of bisphenol A with (b) one or more polyhydric phenols such as bisphenol A; and optionally (2) one or more polyhydric phenols such as bisphenol A; with (B) a material having only one vicinal epoxy group per molecule such as the glycidyl ether of t-butyl phenol or mixture of such materials; in the presence of an effective quantity of a suitable catalyst such as ethyltriphenylphosphonium acetate acetic acid complex; and (II) at least one of (A) one or more pigments, (B) one or more dyes; (C) one or more fillers; or (D) any combination thereof.

6 Claims, No Drawings

PAINT FORMULATION COMPRISING A THERMALLY STABLE CAPPED THERMOPLASTIC PHENOLIC RESIN

This is a division of application Ser. No. 755,260, filed July 15, 1985, now U.S. Pat. No. 4,632,971 issued 12-30-86.

BACKGROUND OF THE INVENTION

The present invention concerns capped thermoplastic phenolic resins and coatings prepared therefrom.

Thermoplastic (non-thermoset) phenolic resins have been employed in the formulation of highway, pavement, marking paints as disclosed by J. M. Dale in *DEVELOPMENT OF LANE DELINEATION WITH IMPROVED DURABILITY*, Report No. FHWA-RD-75-70, July 1975. The paint formulations are maintained at elevated temperatures, about 450° F. (232° C.), during application. While they provide a excellent highway marking paint in terms of abrasive resistance, they are deficient in terms of applicability since they exhibit a substantial increase in viscosity while being maintained at the application temperature.

The present invention provides a non-thermoset resin which exhibits a much reduced viscosity increase at elevated temperatures, i.e. more stable.

SUMMARY OF THE INVENTION

The present invention pertains to a thermally stable, thermoplastic phenolic resin prepared by reacting (I)
  (A) the reaction product of
    (1) at least one epoxy resin having an average of more than one vicinal epoxy group per molecule with
    (2) one or more polyhydric phenols; and optionally
  (B) one or more polyhydric phenols; with
(II) a material having only one vicinal epoxy group per molecule or mixture of such materials in any combination;

in the presence of an effective quantity of a suitable catalyst and wherein the components are present in quantities which provide an equivalent ratio of component (I-A-1) to component (I-A-2) of from about 0.7:1 to about 0.95:1, preferably from about 0.8:1 to about 0.92:1, most preferably from about 0.85:1 to about 0.9:1; the ratio of phenolic hydroxyl equivalents of component (I-B) to the phenolic hydroxyl equivalents of component (I-A) is from about 0:1 to about 20:1, preferably from about 1:1 to about 10:1, most preferably from about 2:1 to about 5:1; and the ratio of epoxy equivalents of component (II) to phenolic hydroxyl equivalents in component (I) is from about 0.9:1 to about 1.1:1, preferably from about 0.95:1 to about 1.05:1, most preferably from about 0.97:1 to about 1.02:1.

The present invention also pertains to a paint formulation comprising
(A) the aforementioned thermally stable thermoplastic resin; and
(B) at least one of
  (1) one or more pigments or dyes; or
  (2) one or more fillers; or
  (3) any combination thereof.

DETAILED DESCRIPTION OF THE INVENTION

Suitable epoxy resins which can be employed in the present invention include, for example, those represented by the formulas

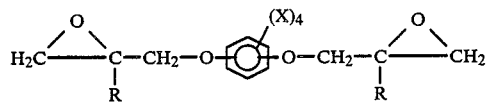

I.

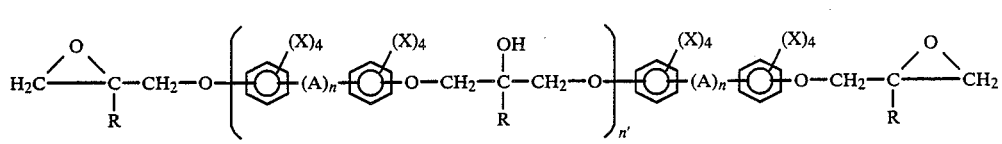

II.

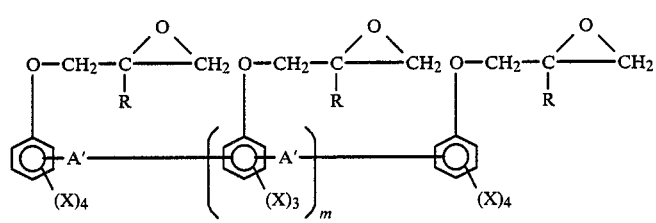

III.

IV.

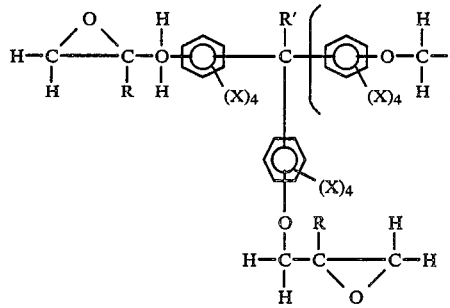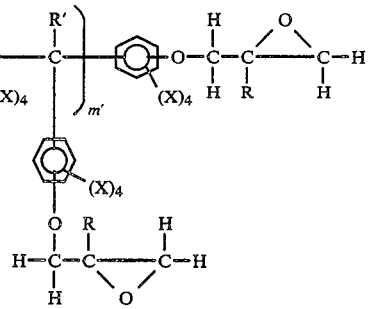

wherein each A is independently a divalent hydrocarbyl group having from 1 to about 10, preferably from 1 to about 6 carbon atoms, —S—, —S—S—,

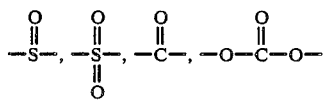

or —O—; each A' is independently a divalent hydrocarbyl group having from 1 to about 10, preferably from 1 to about 6 carbon atoms; each R is independently hydrogen or a hydrocarbyl group having from 1 to about 4 carbon atoms; R' is hydrogen or a hydrocarbyl group having from 1 to about 10, preferably from 1 to about 6 carbon atoms; each X is independently hydrogen, a halogen, preferably chlorine or bromine, or a hydrocarbyl group having from 1 to about 12 carbon atoms, n has a value of zero or 1; n' has an average value of from about zero to about 40, preferably from about zero to about 11.5; m has an average value of from about 0.001 to about 6, preferably from about 0.1 to about 3; and m' has an average value of from zero to about 4, preferably from about 0.1 to about 2.

The term hydrocarbyl as employed herein means any aliphatic, cycloaliphatic, aromatic, aryl substituted aliphatic or aliphatic substituted aromatic groups. Likewise, the term hydrocarbyloxy group means a hydrocarbyl group having an oxygen linkage between it and the object to which it is attached.

Particularly suitable epoxy resins include the glycidyl ethers of polyhydric phenols such as resorcinol, catechol, hydroquinone, bisphenol A, bisphenol F, bisphenol K, tris-hydroxyphenyl methane, mixtures thereof and the like.

Suitable polyhydric phenolic compounds which can be employed herein include, for example, those represented by the formulas

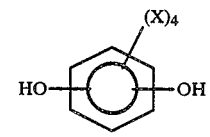

V.

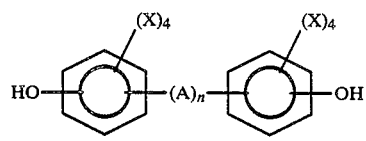

VI.

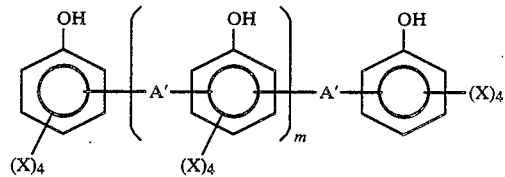

VII.

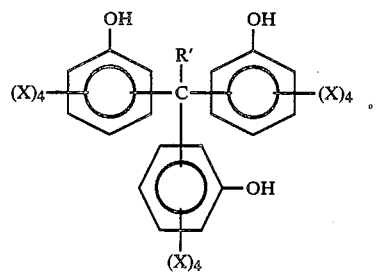

VIII.

wherein A, A', R', X, n and m are as hereinbefore defined.

Particularly suitable polyhydric phenolic materials include, for example, resorcinol, catechol, hydroquinone, bisphenol A, bisphenol F, bisphenol K, tris-hydroxyphenyl methane, mixtures thereof and the like.

Suitable compounds having only one vicinal epoxy group per molecule which can be employed herein include epoxyalkanes, glycidyl ethers of monohydroxyl containing aliphatic, cycloaliphatic or aromatic compounds, mixtures thereof and the like. Such materials can suitably be represented by the formulas

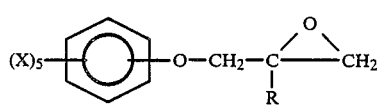

IX.

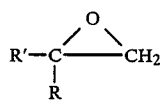

X.

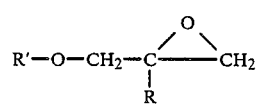

XI.

wherein R, R' and X are as hereinbefore defined.

Particularly suitable such monoepoxy materials include, for example, ethylene oxide, propylene oxide, 1,2-epoxybutane, 2,3-epoxybutane, 1,2-epoxypentane, 1,2-epoxyhexane, 1,2-epoxyheptane, 1,2-epoxyoctane, 1,2-epoxynonane, 1,2-epoxydecane, phenyl glycidyl ether, cresyl glycidyl ether, nonylphenyl glycidyl ether, mixtures thereof and the like.

Suitable catalysts for effecting the reaction between an epoxy group and a phenolic hydroxyl group include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216 and 4,366,295, all of which are incorporated herein by reference.

Particularly suitable catalysts are those quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate.ácetic acid complex), tetrabutylphosphonium chloride, tetrabutylphosphonium bromide, tetrabutylphosphonium iodide, tetrabutylphosphonium acetate, tetrabutylphosphonium diacetate (tetrabutylphosphonium acetate.acetic acid complex), butyltriphenylphosphonium tetrabromobisphenate, butyltriphenylphosphonium bisphenate, butyltriphenylphosphonium bicarbonate, benzyltrimethylammonium chloride and tetramethylammonium hydroxide.

Other suitable catalysts include tertiary amines such as, for example, triethylamine, tripropylamine, tributylamine, 2-methylimidazole, benzyldimethylamine, N-methyl morpholine, mixtures thereof and the like.

If desired, the thermally stable thermoplastic resins of the present invention can be mixed with thermally stable thermoplastic epoxy resins such as those disclosed by Cavitt and Beasley in U.S. application Ser. No. 715,305, filed Mar. 25, 1985. They described thermoplastic epoxy resins which had been capped with reactive monofunctional materials such as phenols, alcohols, secondary amines, thiols, isocyanates, water and the like.

Suitable pigments which can be employed herein include any which will provide the coating with the desired color such as, for example, titanium dioxide, lead chromate, zinc chromate, chrome green, pthalocyamine green and blue, iron oxide, combinations thereof and the like.

Suitable fillers which can be employed herein include, for example, calcium carbonate, talc, glass beads, powdered or flaked zinc or alumina, powdered or flaked glass, colloidal silica, combinations thereof and the like.

The following examples are illustrative of the present invention, but are not to be construed as to limiting the scope thereof in any manner.

Viscosities and softening points were determined using a Brookfield Thermosel and a Mettler Softening Point Apparatus, respectively. Aging studies were done using an electrically heated convection oven.

The following components were employed in the examples:

Epoxy Resin A is the diglycidyl ether of bisphenol A having an epoxide equivalent weight (EEW) of 1686.

Epoxy Resin B is the diglycidyl ether of bisphenol A having an EEW of about 187.

Epoxy Resin C is the diglycidyl ether of bisphenol A having an EEW of about 1650.

Epoxy Resin D is the diglycidyl ether of bisphenol A having an EEW of about 190.2.

Monoepoxy A is the glycidyl ether of t-butyl phenol having an EEW of about 224.

Monoepoxy B is the glycidyl ether of cresol having an EEW of about 197.

Monoepoxy C is the glycidyl ether of a mixture of $C_8$–$C_{10}$ alcohols commercially available from AZS Corp. as AZEPOXY Number 7.

Catalyst A is a 70 weight percent solution of ethyltriphenylphosphonium acetate.acetic acid complex in methanol.

Resin A is a resin made by reacting 2 parts bisphenol A with 1 part by weight propylene oxide.

EXAMPLE 1

(Preparation of Thermoplastic Phenolic Resin—A Precursor to the Present Invention)

To a reacton vessel equipped with a stirrer, thermometer and nitrogen purge was added 748 g (4 epoxy equivalents) of Epoxy Resin B and 570 g (5 equivalents) of bisphenol A. The contents were heated to 90° C. whereupon 1.5 g (0.0026 mole) of Catalyst A was added. The reaction temperature was increased to 150° C. then allowed to exotherm to 206° C. The reaction mass temperature was maintained at 190° C. for 1.05 hours (3780 s), then 565 g (4.96 equivalents) of bisphenol A was added. After the bisphenol A was added, the mixture was digested for 0.5 hour (1800 s) at 185°–190° C. This material had a phenolic hydroxyl equivalent weight of 315.

EXAMPLE 2

(Capping of Thermoplastic Phenolic Resin with Monoepoxy Compound)

To a reaction vessel equipped with a stirrer, thermometer and nitrogen purge was added 100 g (0.446 epoxy equivalent) of Monoepoxy A and 141 g (0.448 phenolic hydroxyl equivalent) of Example 1. The contents were heated to 90° C. whereupon 0.15 g (0.0003 mole) of Catalyst A was added. The reaction temperature was increased to 170° C. and maintained for 2 hours (7200 s). The resultant product had a percent epoxide of 0.6.

EXAMPLE 3

(Capping of Thermoplastic Phenolic Resin with Monoepoxy Compound)

To a reaction vessel equipped with a stirrer, thermometer and nitrogen purge was added 100 g (0.508 epoxy equivalent) of Monoepoxy B and 159.8 g (0.507 phenolic hydroxyl equivalent) of Example 1. The contents were heated to 90° C. whereupon 0.15 g (0.0003 mole) of Catalyst A was added. The reaction temperature was increased to 170° C. and maintained for 1.02 hours (3672 s). The resultant product had a percent epoxide of 0.74.

EXAMPLE 4

(Capping of Thermoplastic Phenolic Resin With Monoepoxy Compound)

To a reaction vessel equipped with a stirrer, thermometer and nitrogen purge was added 85.6 g (0.38 epoxy equivalent) of Monoepoxy C and 120 g (0.381 phenolic hydroxyl equivalent) of Example 1. The contents were heated to 90° C. whereupon 0.13 g (0.0002 mole) of Catalyst A was added. The reaction temperature was increased to 170° C. and maintained for 6.5 hours (23,400 s). The resultant product had a percent epoxide of 0.73.

COMPARATIVE EXPERIMENT A

A blend of two components was prepared. One component was Epoxy Resin C and the other component was Epoxy Resin D. The ratio of Epoxy Resin C to Epoxy Resin D was 67.5:32.5 parts. All parts were based on mass.

COMPARATIVE EXPERIMENT B

In a reaction vessel equipped with a stirrer, thermometer and nitrogen purge was added 200 g (0.119 epoxy equivalent) of Epoxy Resin A, 100 g (0.535 epoxy equivalent) of Epoxy Resin B, 141.9 g (0.645 mole) of nonyl phenol and then heated to 130° C. whereupon 0.21 g (0.0004 mole) of Catalyst A was added. The reaction temperature was increased to 180° C. The temperature was decreased to 170° C. and maintained for 3 hours (10,800 s).

EXAMPLE 5

Various materials were blended with some of the previously prepared thermally stable phenolic resins of the present invention. The composition, softening temperature and viscosity are given in Table I.

TABLE I

| SAMPLE NUMBER | RESIN ONE TYPE/GRAMS | RESIN TWO TYPE/GRAMS | VISCOSITY* cps/Pa · s | SOFTENING POINT, °C. |
|---|---|---|---|---|
| A | Comp. Expt. B | None | 129.5/0.1295 | 85.1 |
| B | Ex. 1 | None | 152/0.152 | 96.3 |
| C | Ex. 2 | None | 54/0.054 | 83.1 |
| D | Ex. 3 | None | 43/0.043 | 69 |
| E | Ex. 4 | None | 39/0.039 | 54.6 |
| F | Comp. Expt. B/20 | Ex. 4/1.05 | 124/0.124 | 84.8 |
| G | Comp. Expt. B/20 | Ex. 4/2.22 | 111/0.111 | 83.5 |
| H | Comp. Expt. B/20 | Ex. 4/3.53 | 104/0.104 | 80.1 |
| I | Ex. 2/20 | Ex. 4/1.05 | 53.5/0.0535 | 81.5 |
| J | Ex. 2/20 | Ex. 4/2.22 | 52.5/0.0525 | 80.3 |
| K | Ex. 2/20 | Ex. 4/3.53 | 51.5/0.0515 | 77.7 |
| L | Ex. 2/20 | Resin A/1.05 | 46.5/0.0465 | 80 |
| M | Ex. 2/20 | Resin A/2.22 | 40/0.040 | 76.1 |
| N | Ex. 2/20 | Resin A/3.53 | 34/0.034 | 73.2 |

*The viscosity was determined at 450° F. (232° C.).

EXAMPLE 6

The resins of Comparative Experiment A and Examples 1, 2, 3 and 4 were subjected to a thermal stability test. The viscosities and softening points of the samples before and after heat aging are reported in Table II.

TABLE II

| SAMPLE NUMBER | RESIN | VISCOSITY, cp/Pa · s | | Softening Point, °C. | |
|---|---|---|---|---|---|
| | | INITIAL | AFTER AGING | INITIAL | AFTER AGING |
| A* | Comp. Expt. A | 211/0.0211 | Gelled | N.D.** | N.D.** |
| B* | Ex. 1 | 152/0.152 | 75/0.075 | 96.3 | 87.6 |
| C | Ex. 2 | 54/0.054 | 60.5/0.0605 | 83.1 | 87.7 |
| D | Ex. 3 | 43/0.043 | 47/0.047 | 69.0 | 72.4 |
| E | Ex. 4 | 39/0.039 | 53.5/0.0535 | 54.6 | 67.3 |

*Not an example of the present invention.
**Not determined.

EXAMPLE 7

Traffic paints were formulated from the thermoplastic phenolic resins of Examples 1 and 3. The formulations are given below.

| COMPONENT A (White) | COMPONENT B (Yellow) |
|---|---|
| Resin, 40 g | Resin, 40 g |
| Titanium Dioxide, 8 g | Lead Chromate, 8 g |
| Calcium Carbonate, 8 g | Calcium Carbonate, 8 g |
| 200 Mesh Glass Beads, 11.2 g | 200 Mesh Glass Beads, 11.2 g |

The components of each component were blended and poured into aluminum pans which were placed in a 311° F. (155° C.) oven for 0.5 hour (1800 s). Each was removed and placed on a 200° C. hot plate then mixed together. The viscosity of the traffic paints was then measured before and after heat aging for 24 hours (86,400 s) at 450° F. (232° C.).

The results are given in the following Table III.

TABLE III

| RESIN | INITIAL VISCOSITY cps/Pa · s | VISCOSITY AFTER HEAT AGING cps/Pa · s |
|---|---|---|
| EXAMPLE 1* | 286/0.286 | 273/0.273 |
| EXAMPLE 3 | 78/0.078 | 79.5/0.0795 |

*Not an example of the present invention

I claim:

1. A paint formulation comprising
   (I) a thermally stable, thermoplastic phenolic resin prepared by reacting
   (A)
     (1) the reaction product of
       (a) at least one epoxy resin having an average of more than one vicinal epoxy group per molecule with
       (b) one or more polyhydric phenols; and optionally
   (B)
     (2) one or more polyhydric phenols; with (B) a material having only one vicinal epoxy group per molecule or mixture of such materials;

in the presence of an effective quantity of a suitable catalyst and wherein the components are present in quantities which provide an equivalent ratio of component (A-1-a) to component (A-1-b) of from about 0.7:1 to about 0.95:1, the ratio of phenolic hydroxyl equivalents of component (A-2) to the phenolic hydroxyl equivalents of component (A-1) is from about 0:1 to about 20:1, and the ratio of epoxy equivalents from component (B) to phenolic hydroxyl equivalents in component (A) is from about 0.9:1 to about 1.1:1; and (II) at least one of
  (A) one or more pigments;
  (B) one or more dyes;
  (C) one or more fillers; or
  (D) any combination thereof.

2. A paint formulation of claim 1 wherein
(i) the epoxy groups contained in components (A-1-a) and (B) are glycidyl ether groups;
(ii) the equivalent ratio of component (A-1-a) to component (A-1-b) is from about 0.8:1 to about 0.92:1;
(iii) the ratio of phenolic hydroxyl equivalents from component (A-2) to the phenolic hydroxyl equivalents from component (A-1) is from about 1:1 to about 10:1; and
(iv) the ratio of epoxy equivalents from component (B) to phenolic hydroxyl equivalents from component (A) is from about 0.95:1 to about 1.05:1.

3. A paint formulation of claim 2 wherein
(i) the equivalent of component (A-1-a) to component (A-1-b) is from about 0.85:1 to about 0.9:1;
(ii) the ratio of phenolic hydroxyl equivalents from component (A-2) to the phenolic hydroxyl equivalents from component (A-1) is from about 2:1 to about 5:1; and
(iii) the ratio of epoxy equivalents from component (B) to phenolic hydroxyl equivalents from component (A) is from about 0.97:1 to about 1.02:1.

4. A paint formulation of claim 3 wherein
(i) component (A-1-a) is an epoxy resin or a mixture of epoxy resins represented by formulas (I), (II), (III) or (IV) in the specification wherein each A is independently a divalent hydrocarbyl group having from 1 to about 10 carbon atoms, —S—, —S—S—,

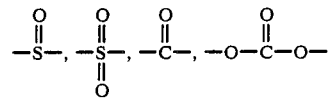

or —O—; each A' is independently a divalent hydrocarbyl group having from 1 to about 10 carbon atoms; each R is independently hydrogen or a hydrocarbyl group having from 1 to about 4 carbon atoms; R' is hydrogen or a hydrocarbyl group having from 1 to about 10 carbon atoms; each X is independently hydrogen, a halogen, or a hydrocarbyl group having from 1 to about 12 carbon atoms; n has a value of zero or 1; n' has an average value of from about zero to about 40; m has an average value of from about 0.001 to about 6; m' has an average value from 0 to about 4;

(ii) components (A-1-b) and (2) are independently a polyhydric phenolic compound or mixture of such compounds represented by formulas (V), (VI), (VII) or (VIII) in the specification wherein A, A', R', X, n and m are as defined above; and (iii) component (B) is selected from monoepoxy compounds represented by formulas (IX), (X) or (XI) in the specification wherein each R, R' and X are as defined above.

5. A paint formulation of claim 4 wherein
(i) component (A-1-a) is one or more epoxy reins represented by the formula (II) wherein A is a divalent hydrocarbyl group having from 1 to about 10 carbon atoms, each X is independently hydrogen, an alkyl group having from 1 to about 4 carbon atoms or bromine, n has a value of 1 and n' has an average value of from about 0.035 to about 2; and
(ii) components (A-1-b) and (A-2) are independently one or more phenolic compounds represented by formula (VI).

6. A paint formulation of claim 5 wherein
(i) component (A-1-a) is a diglycidyl ether of bisphenol A having an EEW of from about 1500 to about 3500;
(ii) components (A-1-b) and (A-2) are bisphenol A; and
(iii) component (B) is the glycidyl ether of t-butyl phenol, the glycidyl ether of cresol, propylene oxide or a mixture thereof.

* * * * *

UNITED STATES PATENT AND TRADEMARK OFFICE
CERTIFICATE OF CORRECTION

PATENT NO. : 4,713,404

DATED : December 15, 1987

INVENTOR(S) : Michael B. Cavitt

It is certified that error appears in the above-identified patent and that said Letters Patent is hereby corrected as shown below:

1st page, under ABSTRACT, lines 13-14; change "acetate acetic" to --acetate.acetic--.

Col. 3, lines 2-16, Formula IV; change the "-O-" group which is attached to the left-most benzene ring to -- -C-O- --.

Col. 4, line 24, Formula VII; change the 2nd occurrence of "$(X)_4$" to --$(X)_3$--.

Col. 6, line 17; change "reacton" to --reaction--.

Col. 6, line 52; insert --g-- after "0.15".

Col. 10, line 17; insert --and-- after "6;".

Col. 10, line 29; change "reins" to --resins--.

Signed and Sealed this

Eighteenth Day of October, 1988

Attest:

DONALD J. QUIGG

Attesting Officer    Commissioner of Patents and Trademarks